United States Patent Office 2,787,101
Patented Apr. 2, 1957

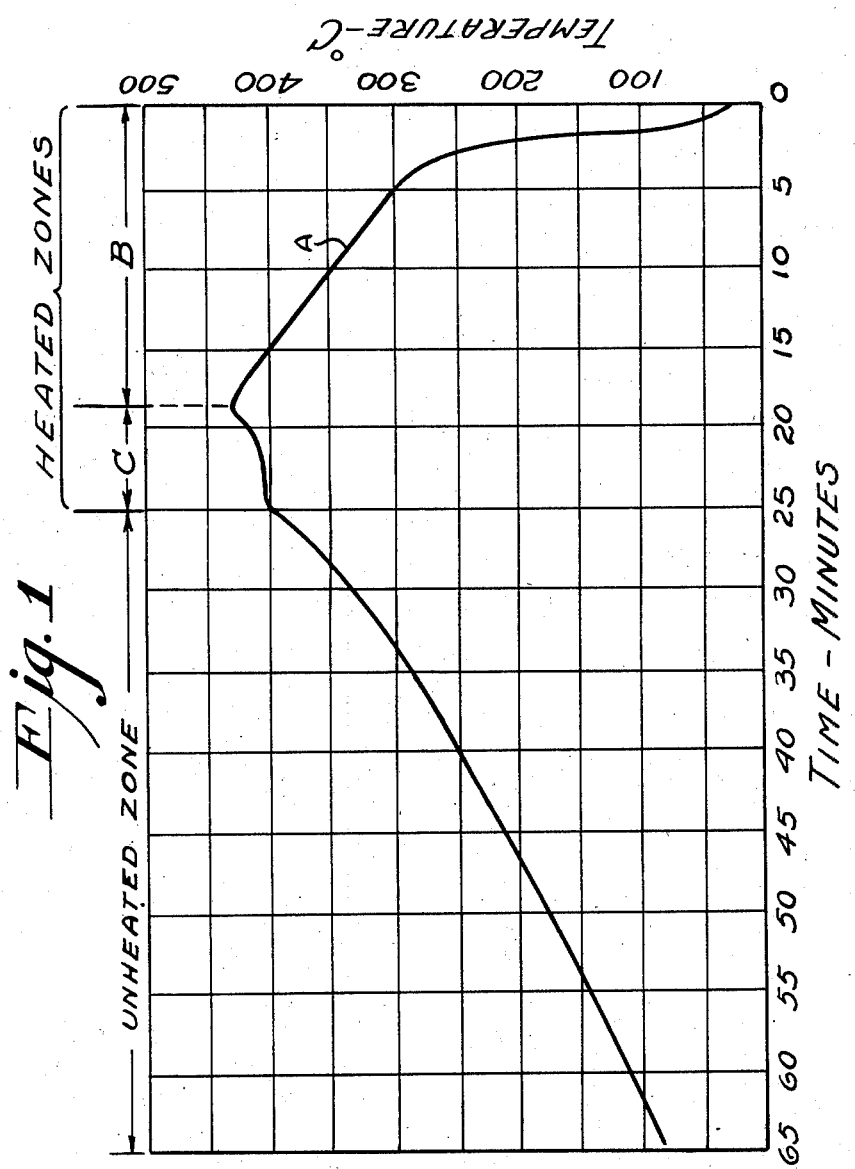

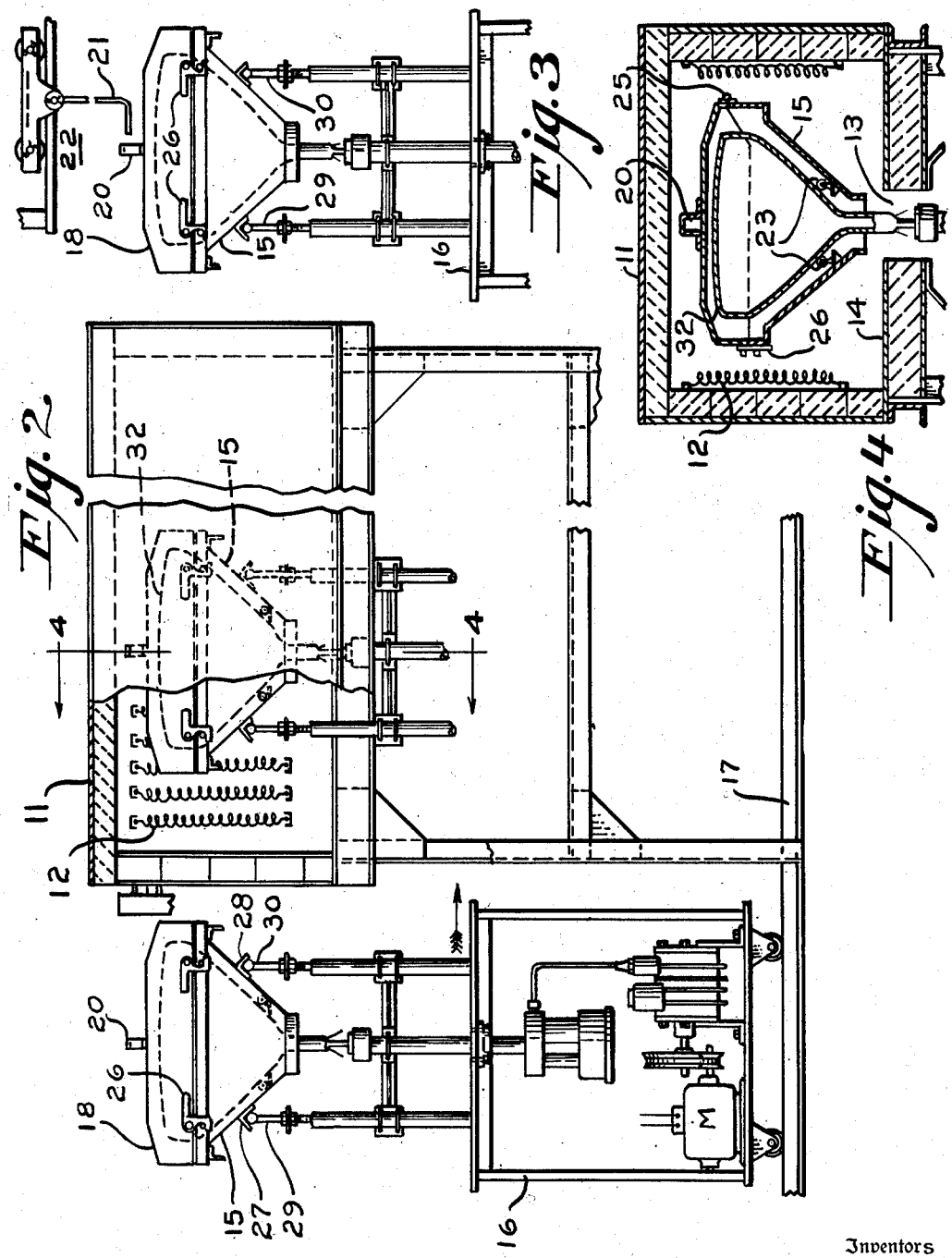

2,787,101
PICTURE-TUBE PROCESSING

Robert B. Randels, Percy L. Orr, and John L. Sheldon, Corning, N. Y., assignors to Corning Glass Works, Corning, N. Y., a corporation of New York Application July 28, 1953, Serial No. 370,778

3 Claims. (Cl. 53—9)

The present invention relates in general to the manufacture of television picture tubes and glass articles of similar character that require degassing of their inner surfaces and/or any coatings thereon by heat treatment during their evacuation.

At the present time it is usual practice to degas or bake-out and evacuate television picture tubes by placing them neck down on so-called exhaust carts, connecting the interior of each tube to evacuating equipment carried by its individual cart, passing the tube while supported by the cart through an exhaust oven adapted to heat the tube to a predetermined bake-out temperature, and then permitting the baked-out tube to cool to a predetermined temperature somewhat above room temperature before its issuance from the oven. Outgassing of the electron gun and of the cathode generally take place during such cooling. The tube is then sealed off outside the oven, disconnected from the evacuating apparatus, and conveyed to a station where other operations are to be performed thereon.

An upward temperature gradient is maintained in the exhaust oven from its inlet end to an intermediate zone to heat the tube to its bake-out temperature, and a downward temperature gradient is maintained in the exhaust oven from such intermediate zone to its outlet end to permit the tube to cool to a temperature at which it can be safely removed from the oven. These temperature gradients are required because of the glass components in a picture tube, such glass components preventing placing the tube directly into and removal thereof directly from an atmosphere maintained at or above the bake-out temperature, which is generally on the order of 375 to 400° C. In the treatment of all-glass tubes, moreover, despite the fact that such tube is usually evacuated to a sufficient extent by the time its envelope has been adequately outgassed, it is necessary to cool the tube carefully and slowly from the bake-out temperature in order to avoid the creation of pressure and/or thermal stresses that would result in breakage of the tube.

Attempts to speed up such processing of all-glass television picture tubes by substantially reducing the time provided for cooling of such tubes from the bake-out temperature have invariably resulted in a significant increase in the number of implosions. As will be appreciated, as the cooling rate increases, the resultant temperature inequalities between different portions of a tube are increased, thereby resulting in greater thermal stresses and greater likelihood of tube breakage. Because the panel of an all-glass tube is relatively thick, the limiting stress (or the limiting temperature gradient) to which such a tube can be subjected without imploding during evacuation is quickly reached as the cooling time is shortened.

In addition, the exhaust oven is conventionally provided along its length with spaced banks of heating units operated independently of each other, with the result that the temperature gradients are anything but smooth. It frequently happens, therefore, that abrupt changes occur in the downward temperature gradient so that, if such a change cannot be eliminated or otherwise compensated for, the speed at which an all-glass tube is moved through the oven must be reduced to avoid breakage thereof; even then the reduction in speed sometimes fails adequately to reduce tube breakage.

The prime object of the present invention, accordingly, is the provision of a method of and an apparatus for baking out and exhausting all-glass television picture tubes within much shorter periods of time and with substantially less heating and exhausting equipment then heretofore required, thereby substantially reducing the cost of manufacture of such a tube.

Another object is to provide such a tube bake-out and exhaust system that the possibility of implosion is substantially eliminated.

According to the invention, before placement of an all-glass television picture tube on an exhaust cart, such tube is arranged preferably with its neck down within an enclosure which is desirably constructed of a sheet metal, advantageously ordinary sheet steel, or some similar material that absorbs heat well at the temperatures employed and is conveniently provided with supports for spacing the tube from its walls. Preferably the enclosure has a depth sufficient only to accommodate the main body of the tube, commonly referred to as the funnel, and of the viewing screen portion of the tube commonly referred to as the panel portion thereof. An aperture is provided in the bottom wall of the enclosure, through which the tube or funnel neck or at least the evacuating tubulation thereof projects to make it accessible for connection with the evacuating apparatus including the means for appropriately outgassing the electron gun and the cathode and for the subsequent sealing-off operation. Conveniently the top of the enclosure comprises a hinged cover which extends down to the top of the funnel portion of an enclosed tube and is provided with appropriate latches so that it remains securely closed even in the event of accidental implosion of the tube. For convenience of handling of the enclosure, its cover may be provided with an eyelet for receiving a conveyer hook.

When a tube is placed in such an enclosure, it has been found that the enclosure effectually serves as a "built-in" temperature control whereby transfer of heat between a relatively constant-temperature external atmosphere and the atmosphere within the enclosure and within the tube and to or from the tube itself can be accomplished gradually and smoothly without the creation of sufficient thermal shock or stress in the tube to promote failure thereof. Accordingly, such an enclosed tube can be successfully introduced into an exhaust oven, the inlet end of which is maintained at a substantially uniform temperature advantageously sufficient to bring the tube rapidly up to its bake-out temperature and the remainder of which may be maintained at a lower temperature sufficient only to maintain the tube at or substantially at its bake-out temperature. Following its baking-out and evacuation to the desired extent the enclosed tube can be safely transferred from the oven to room atmosphere without regard to its temperature.

As will be appreciated, as the enclosed tube is heated upon introduction into the exhaust oven, heat is transferred to the enclosure primarily by radiation and/or convection as the case may be, the enclosure absorbing such heat and in turn transferring the same to the enclosed tube primarily by radiation. The reverse occurs upon removal of the enclosed tube from the oven, the heated tube losing heat primarily by radiation to the enclosure which absorbs such heat and in turn loses such heat to the room atmosphere primarily by radiation and/or convection. The thermal capacity and the thermal conductivity of the enclosure, of course, affect the rate of heat transfer, as does the nature of the enclosure surface itself. While the enclosure may be made of a shiny surface material, it is preferably made of a material that readily absorbs heat under the operating conditions, as indicated above.

Under these circumstances the exhaust oven need be of only sufficient length to enable the all-glass tube to be sufficiently baked-out and evacuated and thus requires a considerably smaller investment in both capital and space than conventional equipment; and the enclosed tube can be removed from the exhaust oven at its bake-out temperature. If desired, however, the outlet end of the oven may be maintained at a somewhat lower but still elevated temperature. It is no longer necessary therefore to employ an exhaust oven of sufficient length to provide the conventional downward temperature gradient; and the difficulties and disadvantages of such prior practice can thereby be avoided with, moreover, a material reduction in the time and expense required to process a tube so that it can be sealed off.

In carrying out the present invention, an all-glass tube and its surrounding enclosure are arranged on an exhaust cart, which is then introduced into and passed through an exhaust oven of the foregoing characteristics. Preferably the temperature conditions of the oven are such as to effect the necessary bake-out of the tube just within the time required to appropriately evacuate the same so that, if desired, the tube can be issued from the oven and sealed off while at its bake-out temperature. As indicated, however, the baked-out and evacuated tube may be removed from the exhaust oven at a somewhat lower temperature. If desired, sealing-off of the tube can be effected before its actual issuance from the oven or at any convenient time thereafter.

After sealing-off of the tube, usually immediately following its issuance from the oven, the enclosure eyelet can be engaged by a conveyer operative to remove the enclosure and its sealed-off tube from the exhaust cart. Conveniently the enclosed tube can thus subsequently be conveyed successively to the usual tube-terminal and base-applying stations and to any other stations for the treatments necessary to complete and test the tube. In the meantime the enclosure remains around the tube to insure its gradual cooling and to protect surrounding equipment against possible damage and from flying glass should accidental implosion of the tube occur at one or another of such stations.

The form of enclosure employed may vary somewhat with the particular shape and wall thickness characteristics of the tube to be baked out. The above-described enclosure, which has proven very satisfactory for treatment of the present conventional form of all-glass picture tube, in general conforms to the tube shape, but is desirably of such interior dimensions that an inch or more of space is provided between the tube funnel and panel walls and its oppositely disposed walls, suitable refractory pads or rollers being provided to support the tube within the enclosure by the funnel-wall portion thereof. Neither the exact tube enclosure wall spacing or the pads or rollers employed have proved critical, however, to the satisfactory operation of the instant invention. The thickness of the sheet metal should, of course, be sufficient not only to impart adequate structural strength to the enclosure but also to render it resistant to destruction upon accidental implosion of an enclosed tube.

It has been found that, with such an enclosure, the temperature of an all-glass tube can be raised rapidly and smoothly and at such a rate that a bake-out temperature on the order of 400° C. can be imparted to the tube while evacuating the same without introduction of sufficient thermal stresses therein to promote implosion thereof. It has also been found that such an enclosure permits the evacuated tube while at the bake-out temperature or at a selected lower but elevated temperature to be removed from such heated atmosphere and then sealed off and naturally cooled in a room-temperature atmosphere without the introduction of sufficient thermal stresses into the tube to effect implosion thereof. It has been further found that, if desired, the tube may be successfully cooled at an accelerated rate by subjecting the enclosure to a cooling medium, such as blower air for example, following its issuance from the exhaust oven.

Any implosion that may occur during heating-up of the tube within the enclosure would most likely result from the thin funnel portion of the tube heating and expanding at a faster rate than the relatively thicker panel portion thereof. Should this trouble be encountered, it can be obviated by insulating the thin funnel portion of the tube to delay its temperature rise to conform to that in the thicker panel portion of the tube, as by increasing the thickness of the enclosure wall surrounding the funnel portion of the tube, by giving such portion of the enclosure wall a poorer heat-radiating surface, by providing a built-in baffle parallel to such portion of the enclosure wall, or by resorting to a combination of these expedients.

It may be desirable for one reason or another to employ sheet metal of insufficient thickness to withstand entirely damage caused by an implosion; in such case the damage can be localized by providing suitable reinforcing ribs on the exterior of the enclosure. It is also possible to employ sheet metal or foil of insufficient thickness to provide any appreciable degree of structural strength, in which case the enclosure can be formed by draping the thin sheet or foil over the tube so that it is more or less in direct contact therewith; in such event, of course, suitable provisions must be made for supporting the tube on the exhaust cart and for conveying the baked-out tube to other stations. As will be appreciated, suitable wire screen reinforcement or the like should be provided.

Furthermore, if one is willing to sacrifice some of the safety factors afforded by an impervious sheet-metal enclosure, the bake-out time for a given oven temperature can be further reduced through use of an enclosure made wholly or partly of a suitable screen material. Moreover, a tube within a sheet-metal enclosure that will attain a desired temperature in a given time in an oven at one temperature will attain such desired temperature in the same time at a substantially lower temperature providing the enclosure is of a suitable screen material. By way of illustration, approximately the same bake-out time was experienced with a sheet-metal enclosure and an oven temperature of 475° C. as with an oven temperature of 425° C. and a metal screen of ⅛" mesh as the enclosure material.

To enable a better understanding of the invention reference is now made to the accompanying drawings. In such drawings:

Fig. 1 is a plot showing a typical curve of the air temperature rise adjacent the exterior wall of an all-glass television picture tube processed within an enclosure embodying the invention. In the particular case shown, the enclosed tube is passed through a generally uniformly heated atmosphere above the bake-out temperature of the tube and then through a similarly heated atmosphere at a somewhat lower temperature, the curve also showing the temperature of such air during cooling of the enclosed tube subsequent to its transfer from such latter heated atmosphere to an atmosphere at room temperature.

Fig. 2 shows, in side elevation and partly in section, an exhaust oven occupied by a cart-supported enclosure containing an all-glass television picture tube to be evacuated and baked-out during its passage through such oven. To the left of such oven, Fig. 2 also shows a cart supporting such a tube within an enclosure about to be introduced into the oven.

Fig. 3 shows a cart-supported tube within an enclosure that is assumed to have just issued from the oven of Fig. 2, and also shows a fragment of an associated overhead conveyor.

Fig. 4 is a sectional view taken on line 4—4 of Fig. 2.

Referring now to Fig. 1 it will be observed that the curve A, showing the temperature of the air just outside an enclosed all-glass picture tube, indicates that a somewhat steep and relatively uniform temperature rise from approximately 25° C. to 300° C. occurs during the first five minutes or so of travel through a zone B of an exhaust oven heated to a temperature of about 475° C. throughout the major portion of its length. Because the temperature differential becomes increasingly smaller, the subsequent rate of temperature rise of such air is more gradual but still substantially uniform. In all, an elapsed time of approximately eighteen minutes is consumed before the air immediately adjacent the tube attains a temperature of about 425° C. By this time the tube itself has attained a temperature of approximately 400° C. and enters exhaust oven zone C, which is advantageously heated to a temperature somewhat lower but sufficient to maintain the tube at its attained temperature for the time necessary to effect the desired bake-out. As indicated, the temperature of the air adjacent the tube after its passage through zone B drops rather rapidly but not too sharply to approximately 400° C. and remains substantially constant through zone C.

The enclosed tube is desirably now issued to room atmosphere. The temperature drop of the tube is thereupon so retarded by the enclosure that the temperature of the tube and the surrounding air follows the substantially straight-line portion of the curve until the tube temperature drops to a value at which the tube can be safely removed from the enclosure. As previously stated, sealing-off of the baked out and evacuated tube can be effected at any time, but ordinarily will be effected immediately following or shortly after its issuance from zone C.

As will be observed, the curve A is not only smooth throughout the heating cycle but is also gradual and smooth during the cooling cycle that occurs after issuance of the enclosure from the heated zones. In contrast to conventional practice, the characteristic abrupt changes are absent from such curve.

It will be appreciated that the time required to heat the tube to its bake-out temperature can be shortened by employing a higher temperature throughout oven zone B or by dividing zone B into two or more subzones of increasing temperatures. The heating is generally effected in such a manner that the temperature of the tube is not raised up to the strain point of its glass envelope. In addition, the maximum temperature to which the screen phosphors can be safely subjected should not be exceeded.

It will also be appreciated that the exhaust oven can alternatively be maintained at a substantially uniform temperature throughout its length. Moreover, the portion of the oven immediately adjacent its outlet end may be maintained at a still somewhat lower temperature so that the enclosed tube is removed from the oven at a temperature (say, about 350° C.) a little below its bake-out temperature.

Referring to the remaining figures of the drawings in detail, the exhaust oven 11 is conventional in form but is advantageously provided with suitable electric heating elements such as 12 having controls (not shown) necessary to maintain the desired temperatures. Oven 11 is also provided with a slot 13 (Fig. 4) running longitudinally through its bottom wall 14, so that a sheet-metal tube enclosure 15 supported on an exhaust cart such as 16 can be passed through oven 11 by advancing the cart thereunder over a suitable track 17, as is customary practice.

To facilitate handling of enclosure 15, its cover 18 is provided with an eyelet 20 for engagement by a hook 21 (Fig. 3) of a suitable hoisting and conveying system 22. This arrangement permits the enclosure 15 to be conveniently lifted from cart 16, following the tube sealing-off operation, and enables the enclosed tube to be forwarded to subsequent stations at which other operations may be performed on the tube prior to its removal from the enclosure.

To give ready access to a tube within the enclosure 15, cover 18 comprises a substantial portion thereof. Cover 18 on one side is hinged at 25 and at the opposite side is provided with latches 26. Angle irons 27 and 28 are secured to the opposite external sides of the enclosure as a convenient means of supporting it on bars 29 and 30 upstanding from cart 16. To support a tube 32 within enclosure 15 in suitably spaced relation with the walls thereof, a number of suitably mounted rollers such as 23 are provided, spaced about the interior walls of such enclosure, although obviously spacers in the form of pads of heat-resistant material may be employed alone or in conjunction with such rollers if desired.

Such an enclosure, as will be appreciated, can also be effectively utilized to speed up the drying and baking of the phosphor screen applied to the interior surface of a television picture tube panel and thereby to accomplish a substantial reduction in the size of the equipment required for such processing. Not only can the tube be heated more rapidly to the screen bake-out temperature without danger of breakage caused by the creation of undue thermal stresses; but the baked-out tube can be removed from the screen-drying oven or lehr at or slightly below the screen bake-out temperature and permitted to cool in the room atmosphere, in substantially the same manner as described above. Since the tube is not evacuated at this stage of its manufacture, no pressure stresses are created therein.

As in the case of the exhaust bake-out procedure, the enclosure also enables the tube, upon its removal from the screen bake-out oven, to be conveniently conveyed to work stations where other operations including the insertion of the electron gun into the tube neck can be performed. Since the enclosure permits any such other operation to be carried out without actually cooling the tube to room temperature, it is thus possible to successively subject a tube to the screen bake-out and the exhaust bake-out without removal of the tube from the enclosure or other separate handling of the tube for the performance of intermediate operations. A considerable reduction in tube-processing time can thereby be achieved.

It will be evident that the invention can also be advantageously employed in the similar treatment of metal-funnel tubes.

We claim:

1. The method of exhausting and baking out a glass television picture tube or the like, that includes placing such tube within an enclosure with the tube and its neck spaced from the walls thereof and with the tube neck evacuating tubulation projecting from the enclosure, then introducing the enclosure into an atmosphere heated sufficiently to bake out the tube, maintaining the enclosure in such atmosphere until the tube is baked out while in the meantime exhausting such tube solely through its evacuating tubulation, thereafter removing the enclosure from such atmosphere, maintaining the baked-out tube within such enclosure until it has cooled sufficiently to permit its safe removal therefrom without breakage, and sealing off the free end of the tube tubulation at any time after the tube has been baked out.

2. A method such as defined by claim 1 wherein the baked-out tube is sealed off after removal of the enclosure from the heated atmosphere.

3. The method of putting a television picture tube through its bake-out and exhaust cycle, which includes arranging the tube within but spaced from the walls of an enclosure with the exhaust tubulation of the tube being also spaced from the enclosure walls and projecting outside such enclosure, then introducing the enclosure into a suitable bake-out atmosphere, exhausting the tube through such exhaust tubulation while being baked out, issuing the enclosed tube from such atmosphere, maintaining the baked-out tube within such enclosure until it has cooled sufficiently to permit its removal therefrom, sealing off the baked-out tube before its removal from the enclosure, and subjecting the enclosure to forced cooling.

References Cited in the file of this patent

UNITED STATES PATENTS

| | | |
|---|---|---|
| 2,223,031 | Edwards | Nov. 26, 1940 |
| 2,532,315 | Johnson et al. | Dec. 5, 1950 |